United States Patent [19]

Naito et al.

[11] Patent Number: 4,623,813

[45] Date of Patent: Nov. 18, 1986

[54] LOAD SENSOR USING A PIEZOELECTRIC S.A.W. DEVICE

[75] Inventors: Kazufumi Naito, Ohtsu; Mitito Utsunomiya, Kusatsu, both of Japan

[73] Assignee: Kabushiki Kaisha Ishida Koki Seisakusho, Kyoto, Japan

[21] Appl. No.: 685,779

[22] Filed: Dec. 24, 1984

[30] Foreign Application Priority Data

Dec. 22, 1983 [JP] Japan ................. 58-243206

[51] Int. Cl.⁴ ............................................ H01L 41/08
[52] U.S. Cl. .................. 310/313 R; 310/338; 73/703; 73/778; 73/DIG. 4; 177/210 FP
[58] Field of Search .............. 310/313 R, 339, 313 B, 310/338, 313 C, 313 D; 333/150–154, 193, 195, 196; 73/763, 774, 778, 781, 754, 514, 517 R, 517 AV, 703, 708, 723, DIG. 4; 177/210 R, 210 FP, 210 EM

[56] References Cited

U.S. PATENT DOCUMENTS

| 3,304,773 | 2/1967 | Rogallo | 73/DIG. 4 |
| 3,470,400 | 9/1969 | Weisbord | 73/778 |
| 3,479,536 | 11/1969 | Norris | 73/517 AV |
| 3,878,477 | 4/1975 | Dias et al. | 73/DIG. 4 |
| 4,096,740 | 6/1978 | Sallee | 73/778 |
| 4,107,626 | 8/1978 | Kiewit | 73/DIG. 4 |
| 4,151,502 | 4/1979 | Kurihara | 73/DIG. 4 |
| 4,295,102 | 10/1981 | Schmidt et al. | 310/313 R X |
| 4,333,342 | 6/1982 | Gilden et al. | 310/313 R |
| 4,512,198 | 4/1985 | Sinha | 310/313 B |

Primary Examiner—Mark O. Budd
Attorney, Agent, or Firm—Staas & Halsey

[57] ABSTRACT

A load sensor includes a fixed rigid portion, a movable rigid portion spaced from the fixed rigid portion and adapted to receive an applied load, and a shear-deformable member provided between the two rigid portions. The shear-deformable portion is provided with a transmission and a reception transducer constituting an elastic surface-wave oscillator. When a load is applied to the movable rigid portion, weight is sensed based on a deviation in the oscillation frequency of the elastic surface-wave oscillator. The fixed and movable rigid portions, as well as upper and lower beams interconnecting these portions, constitute a load-sensitive element. The latter has a side face which is closed off by a pliable membrane for sealing the shear-deformable element disposed within the load-sensitivie element. Alternatively, a corrugated bellows is connected across the fixed and movable rigid portions to seal the shear-deformable member within the bellows.

13 Claims, 14 Drawing Figures

Fig. I
(PRIOR ART)

LOAD SENSOR USING A PIEZOELECTRIC S.A.W. DEVICE

BACKGROUND OF THE INVENTION

This invention relates to a load sensor used in a weigher or the like and, more particularly, to a load sensor so adapted as to sense a load by utilizing elastic surface waves.

An elastic surface-wave oscillator (surface acoustic-wave oscillator) for measuring the magnitude of an unknown applied force by utilizing elastic surface waves (surface acoustic waves) is disclosed in the specification of Japanese Patent Application Laid-Open No. 50-1022. As shown in FIG. 1, this delay line-type elastic surface-wave oscillator generally comprises an elastic surface-wave oscillator which includes a piezoelectric substrate 1 fixed at one end, a transmission transducer 2 composed of interdigital electrodes 2a, 2b disposed on the surface 1a of the substrate 1, a reception transducer 3 spaced a prescribed distance l from the transmission transducer 2 and similarly composed of interdigital electrodes 3a, 3b disposed on the surface 1a of the substrate 1, and an amplifier 4 connected across one electrode 2a of the transducer 2 and one electrode 3a of the transducer 3. The other electrodes 2b, 3b are connected to ground. Owing to such construction, the delay line-type elastic surface-wave oscillator includes a surface wave propagation path I from the transmission transducer 2 to the reception transducer 3 via the substrate surface 1a, and a feedback path II from the reception transducer 3 to the transmission transducer 2 via the amplifier 4.

The oscillator has an oscillation frequency $f_o$ which is a function of the distance l covered by the surface wave propagation path I, and of the velocity v at which the surface wave propagates through the path I. When an external force F acts upon the free end of the substrate 1 as shown for example in the drawing, flexure of the substrate 1 in the manner shown by the phantom lines is accompanied by a change in the distance l, to $l + \Delta l$. Likewise, the propagating velocity changes to $v + \Delta v$ in dependence upon a change in the elasticity of the substrate surface 1a. In consequence, oscillation frequency changes to $f_o + \Delta f_o$. Here the change $\Delta f_o$ in frequency corresponds to the amount of flexure of the substrate 1, namely to the magnitude of the applied force F. Therefore, if the frequency change $\Delta f_o$ is detected, the magnitude of the applied force F can be measured.

To obtain a desired measurement accuracy in a case where an elastic surface-wave oscillator of the above kind is applied to a load sensor, transmission and reception transducers similar to those shown in FIG. 1 are formed on the reverse side of the substrate 1 as well to provide on the reverse side an oscillator identical to that shown. Then, in response to the some applied force, the oscillation frequency of one of the oscillators will change to $f_o + \Delta f_o$, and the oscillation frequency of the other will change to $f_o - \Delta f_o$. The arrangement is such that the difference between these two frequencies, namely $2\Delta f_o$, is then detected.

Strain gauge-type load sensors have long found wide use as the load sensors in weighers and the like. As shown in FIG. 2, such a load sensor, designated at numeral 7, includes a load-sensitive element 5 constituting the main body of the load sensor and is a body which develops strain when subjected to an external load. The load-sensitive element 5 has a hollow, rectangular configuration and comprises a fixed rigid portion 5a at one extremity of the rectangle, a movable rigid portion 5b at the other extremity of the rectangle, and upper and lower beams 5c, 5d extending in parallel and interconnecting the rigid portions 5c, 5d. The upper beam 5c is provided at two locations with flexible portions $5_1, 5_2$ formed by reducing the thickness of the beam. Likewise, the lower beam 6 is provided at two locations with flexible portions $5_3, 5_4$ similarly formed by reducing the thickness of the beam. The load-sensitive element 5 thus has a total of four flexible portions $5_1, 5_2, 5_3, 5_4$. Four strain gauges $6_1, 6_2, 6_3, 6_4$ are bonded to the outer surface of the load-sensitive element 5 at the locations of the flexible portions $5_1, 5_2, 5_3, 5_4$, respectively. The four strain gauges form a bridge circuit. When an external force F of the kind shown in FIG. 2 acts upon the movable rigid portion 5b of the load sensor 7 with the fixed rigid portion 5a thereof being held stationary, the flexible portion $5_1$ of the upper beam 5c on the side of the fixed rigid portion 5a, and the flexible portion $5_4$ of the lower beam 5d on the side of the movable rigid portion 5b, are subjected to tension, while the two other flexible portions $5_2, 5_3$ are subjected to compression. These tensile and compressive forces result in a change in the electrical resistance of the strain gauges $6_1, 6_2, 6_3, 6_4$ located at the flexible portions $5_1, 5_2, 5_3, 5_4$, respectively, so that the bridge circuit produces an electrical output signal. The signal corresponds to the amount of strain developed at the flexible portions $5_1, 5_2, 5_3, 5_4$, namely to the external fource F. This allows the magnitude of the force F to be measured.

A load sensor which operates by using the above-described delay line-type elastic surface wave oscillator can be constructed by utilizing the load-sensitive element 5 of the load sensor 7. Specifically, as shown in FIG. 3, a delay line-type elastic surface-wave oscillatior 9 . . . 9 may be provided in place of each strain gauge on the upper and lower surfaces of a load-sensitive element 8 at flexible portions $8_1, 8_2, 8_3, 8_4$ thereof, each resonator 9 comprising a piezoelectric substrate 9a, a transmission transducer 9b, and a reception transducer 9c, the transducers being disposed on the substrate 9a and spaced from each other by a predetermined distance. The result is a load sensor 10 using a delay line-type elastic surface-wave oscillator and equipped with four elastic surface-wave resonators.

Since the conventional load sensor of the above kind has the delay line-type elastic surface-wave oscillators fixed to the upper and lower surfaces of the load-sensitive element, sealing members are affixed to the load-sensitive element to protect the oscillators from the environment. When such a load sensor is used in, say, a weigher, the overall apparatus must be large enough to prevent the sealing members from contacting the weighing dish or the weigher case. The unfortunate result is a weigher which is large in size.

Another problem with the prior-art load sensor is that since the prior art load sensor is a delay line-type oscillator, it is subject to outside adverse effects and a problem arises in the short-term stability of the sensor output signal.

As shown in FIG. 1, the conventional load sensor has the transmission and reception transducers 2, 3 spaced apart by the distance l to form an elastic surface-wave oscillator unit, with a certain period of time being required for a surface wave to propagate between the two transducers 2, 3. Since the load sensor is a delay line-type oscillator, namely one in which propagation time changes in dependence upon the state of an applied force, a problem arises in the short-term stability of the sensor output signal when the surface wave propagation paths pick up dust, foreign matter such as moisture, scratches or are affected by other such external factors.

In addition to the problem of short-term stability of the output signal, there is a problem related to the positional precision of the elastic surface-wave oscillators on the load-sensitive element. Specifically, as shown in FIG. 3, the transmission transducers 9 . . . 9 are disposed at the flexible portions $8_1$, $8_2$, $8_3$, $8_4$ of the load-sensitive element 8. Since the amount of tension or compression caused by the load at the flexible portions $8_1$, $8_2$, $8_3$, $8_4$ varies greatly with position, a desirable output cannot be obtained if there is even a small error in the positions at which the elastic surface-wave oscillators 9 . . . 9 are disposed.

SUMMARY OF THE INVENTION

An object of the present invention is to provide a load sensor in which there can readily be arranged a sealing structure for protecting from the environment elastic surface-wave resonators which are secured to a load-sensitive element, and in which there is no danger of the sealing structure proper contacting a weighing dish or case when the load sensor is used in a weigher.

Another object of the present invention is to provide a load sensor which is temperature-compensated for high precision.

Still another object of the present invention is to provide a load sensor which excels in terms of the short-term stability of output signals produced by the elastic surface-wave resonators.

A further object of the present invention is to provide a readily manufactured load sensor in which there is freedom in terms of the positions at which elastic surface-wave resonators are disposed.

According to the present invention, the foregoing objects are attained by providing a load sensor comprising a load-sensitive element which includes a fixed rigid portion formed at one end thereof, a movable rigid portion formed at the other end thereof, a shear-deformable portion formed between the two rigid portions, and an elastic surface-wave resonator affixed to the shear-deformable portion of the load-sensitive element.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 10 through 14 are views illustrating embodiments of a one-port elastic surface-wave resonator, in which:

FIG. 10 is a view showing an arrangement wherein the two-port transducer in the embodiment of FIG. 4 is replaced by a one-port transducer;

FIG. 11 is a view showing an arrangement wherein the two-port transducer in the embodiment of FIG. 6 is replaced by a one-port transducer;

FIG. 12 is a view showing an arrangement wherein the two-port transducer in the embodiment of FIG. 7 is replaced by a one-port transducer;

FIG. 13 is a view showing an arrangement wherein the two-port transducer in the embodiment of FIG. 8 is replaced by a one-port transducer; and FIG. 14 is a view showing an arrangement wherein the two-port transducer in the embodiment of FIG. 9 is replaced by a one-port transducer.

DESCRIPTION OF THE PREFERRED EMBODIMENT

Figure 1:
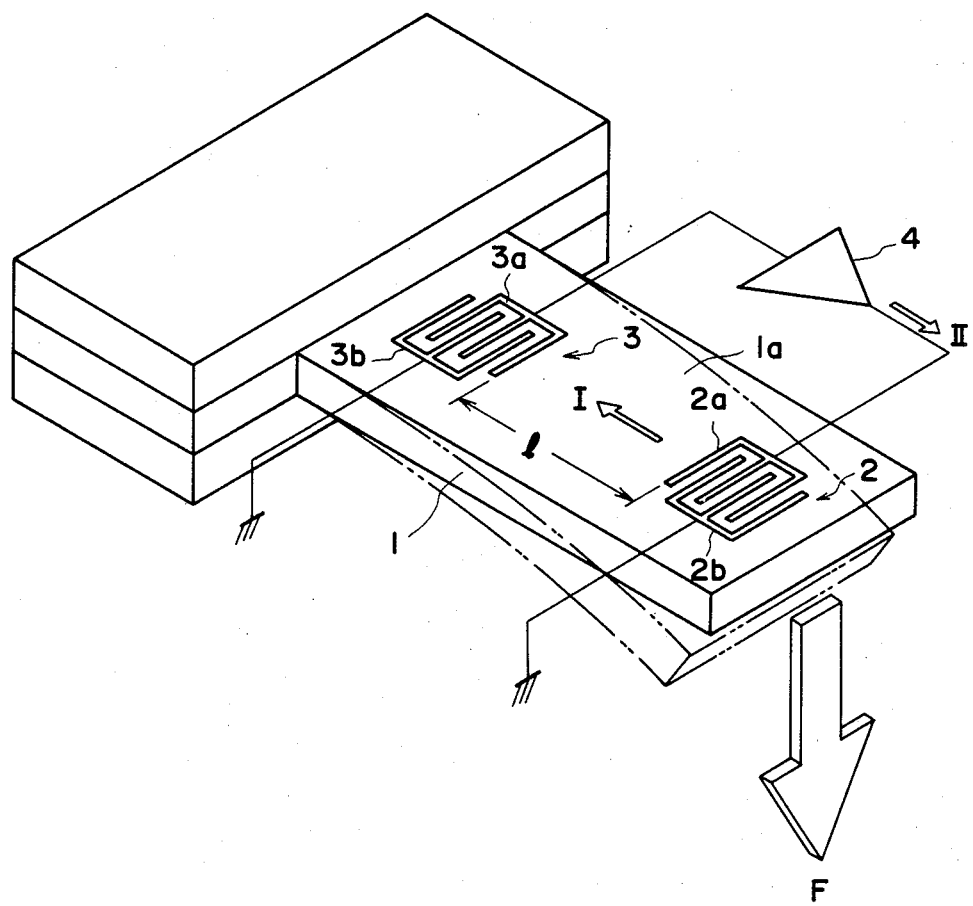
FIG. 1 is a perspective view illustrating the principle of a delay line-type elastic surface-wave oscillator.
Figure 2:
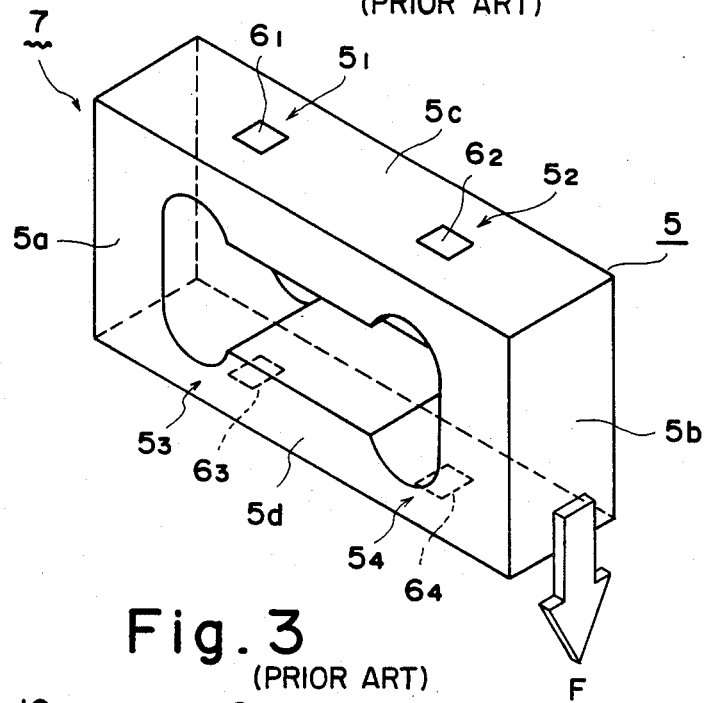
FIG. 2 is a perspective view illustrating a strain gauge-type load sensor according to the prior art.
Figure 3:
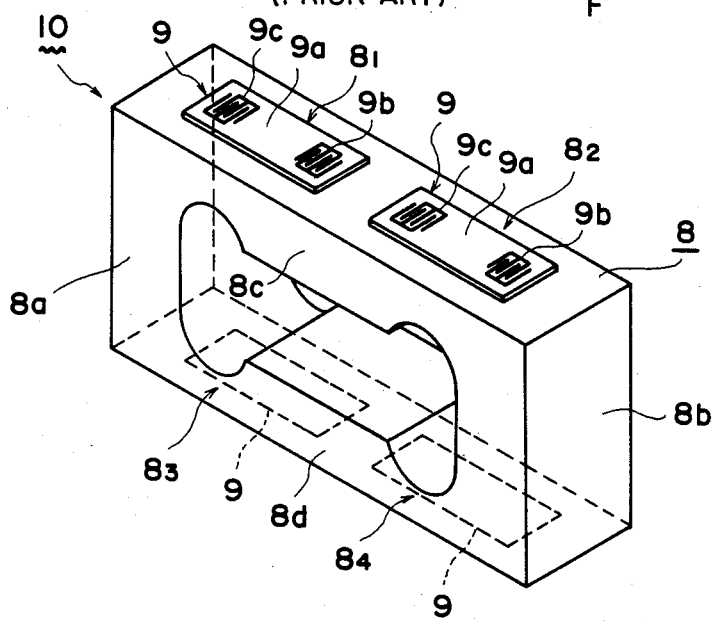
FIG. 3 is a perspective view illustrating a conventional load sensor which uses a delay line-type elastic surface-wave oscillator.

A load sensor in accordance with the present invention will now be described in connection with a preferred embodiment thereof illustrated in the perspective view of FIG. 4. The load sensor, designated at number 11c, includes a load-sensitive element 12c comprising a main body 120 and a plate-shaped shear-deformable member 30. The main body 120 of the load sensor has a hollow, rectangular configuration and comprises a fixed rigid portion 13c, a movable rigid portion 14c spaced from the fixed rigid portion 13c and formed to lie parallel thereto, an upper beam 15c interconnecting the rigid portions 13c, 13d at the upper ends thereof, and a lower beam 16c interconnecting the rigid portions 13c, 13d at the lower ends thereof. The beams 15c, 16c lie parallel to each other. The shear-deformable member 30 is disposed in the hollow portion of the main body 120 and has its end portions fixedly secured to the inner surface of the rigid portions 13c, 14c. The upper and lower beams 15c, 16c are each provided at two locations with a flexible portion 17c formed by reducing the thickness of the beam by the formation of an arcuate cut-out on the inner side thereof. When a load F acts upon the movable rigid portion 14c, the flexible portions 17c flex and deform as shown by the phantom lines by an amount dependent upon the magnitude of the load F.

The plate-shaped shear-deformable member 30 is equipped with a shear-deformable portion 31 comprising a piezoelectric body. The shear-deformable portion 31 is formed at the central portion of the member 30 by reducing the width of the member 30 from the upper and lower sides thereof. The shear-deformable portion 31 has diagonals X—X and Y—Y, as depicted in FIG. 5. When a load acts upon the load-sensitive element 12c and causes the element to deform as shown by the phantom lines in FIG. 4, the shear-deformable portion 31 is deformed by shear from a generally square shape into the shape of a parallelogram, as indicated by the phantom lines in FIG. 5. As a result of such shear-induced deformation, the diagonal line X—X of the shear-deformable portion 31 is shortened to X—$X_1$, while the other diagonal line Y—Y is elongated to Y—$Y_1$. Affixed to one side of the shear-deformable portion 31 and oriented along the diagonal line X—X thereof is a flexible surface-wave resonator 32 consisting of two flexible surface-wave transducers. Affixed to the other side of the shear-deformable portion 31 and oriented along the diagonal line Y—Y thereof is a flexible surface-wave resonator 33 consisting of two flexible surface-wave transducers. Specifically, each of the resonators 32, 33 comprises a transmission transducer 34 having a pair of interdigital electrodes $34_1$, $34_2$ spaced apart by a predetermined distance s, and a reception transducer 35 likewise having a pair of interdigital electrodes $35_1$, $35_2$ spaced apart by a predetermined distance s. The transducers 34, 35 are spaced from each other by a comparatively small distance e. Thus, the elastic surface-wave resonators 32, 33 are arranged so as to make an angle of 45° with the direction of an applied load F (see FIGS. 4 and 9), and so as to perpendicularly intersect each other. It should be noted that an amplifier, not shown, is connected across the electrode $34_1$ of the transducer 34 and the electrode $35_1$ of the transducer 35 on both sides of the shear-deformable portion 31, and that each of the electrodes $34_2$ and each of the electrodes $35_2$ are connected to ground. Further, a load sensing apparatus using this load sensor constitutes electric circuitry adapted to produce a difference between the outputs of oscillating frequencies from the elastic surface-wave resonators 32, 33, and to deliver this difference as an output signal. In order to achieve resonance in an efficient manner, reflectors are required to be provided on the side of each of the resonators 32, 33. However, these reflectors are not shown in the drawings of the illustrated embodiment. In the illustrated embodiment, the shear-deformable portion 31 of the shear-deformable member 30 is composed of a piezoelectric body. However, the shear-deformable member 30 may itself consist of a piezoelectric body, or the shear-deformable member 30 may be formed of an ordinary metal and have a piezoelectric thin film or thin plate consisting of, e.g., quartz, a ceramic or zinc oxide affixed to both side surfaces of the shear-deformable portion 31.

When a load F acts upon the movable rigid portion 14c of the load-sensitive element 12 constituting the load sensor 11c having the above-described construction, the downward deflection of the movable rigid portion 14c is accompanied by deformation, shown by the phantom lines in FIG. 5, of the shear-deformable portion 31 formed at the central portion of the shear-deformable member 30. Consequently, of the two elastic surface-wave resonators 32, 33 provided on the two side surfaces of the shear-deformable portion 31, there is a decrease in the clearance e between the transducers 34, 35, and in the clearance s between the electrodes $34_1$, $34_2$ and between the electrodes $35_1$, $35_2$, of the elastic surface-wave resonator 32 provided along the diagonal line X—X, and there is increase in the clearance e between the transmission and reception transducers 34, 35, and in the clearance s between the electrodes $34_1$, $34_2$ and between the electrodes $35_1$, $35_2$, of the elastic surface-wave resonator 33 provided along the diagonal line Y—Y. As a result, there is a decrease in a resonating frequency from one of the elastic surface-wave resonators 32, 33, and an increase in this resonating frequency in the other of the surface-wave resonators. This is accompanied by a change, in mutually opposing directions, in the oscillation frequencies of the two resonators 32, 33, with the difference between the two frequencies being extracted as the output of the load sensor 11c. More specifically, since the change in the clearance s between the electrodes $34_1$, $34_2$ and between the electrodes $35_1$, $35_2$ will correspond to the load F, an output which is dependent upon the magnitude of the load F can be obtained.

Since the clearance e between the transducers 34, 35 of both resonators 32, 33 is small in the load sensor 11c of the illustrated embodiment, there is little influence from external causes. The result is good short-term stability. In addition, in the load sensor 11c of the illustrated embodiment, the two elastic surface-wave resonators 32, 33 are arranged to make a 45° angle with the direction in which the load is applied, and to cross each other at right angles. Moreover, the difference between the oscillation frequencies of the two elastic surface-wave resonators 32, 33, which frequencies vary in a mutually opposing manner, is extracted as an output signal. As a result, the output signal will be scarecely influenced by, e.g., expansion of the shear-deformable portion 31 caused by a change in temperature. Further, though the elastic surface-wave resonators 32, 33 of the load sensor 11c sense strain arising from shear-induced deformation of the shear-deformable portion 31, the strain developed by the latter in response to the applied load is substantially uniform over a wide range. Therefore, the outputs of the resonators 32, 33 will be influenced very little by some displacement of the positions at which they are disposed. This raises the degree of freedom as to where the resonators may be placed.

Figure 4:
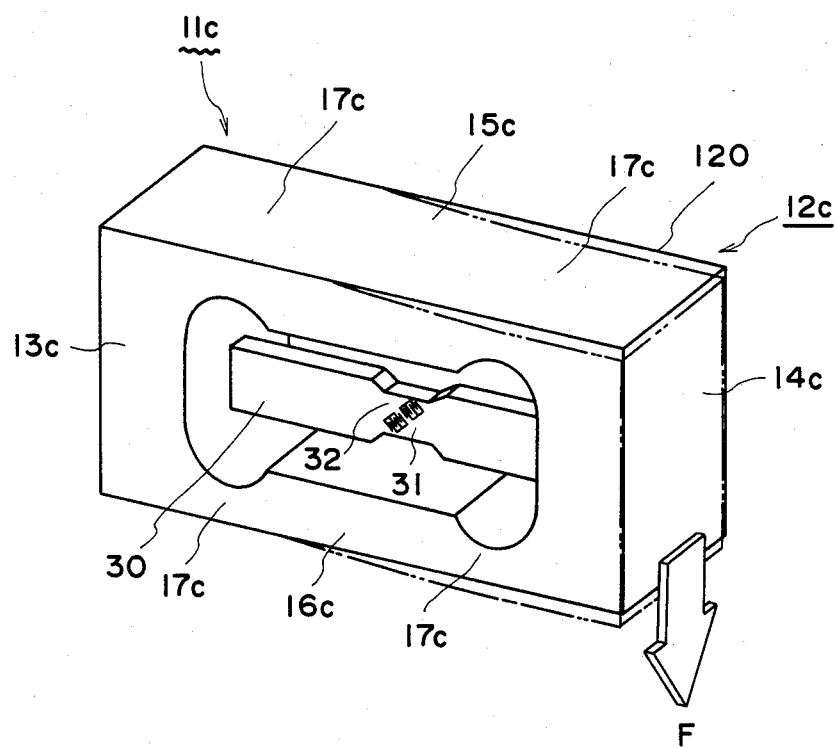
FIG. 4 is a perspective view illustrating an embodiment of a load sensor according to the present invention.
Figure 5:
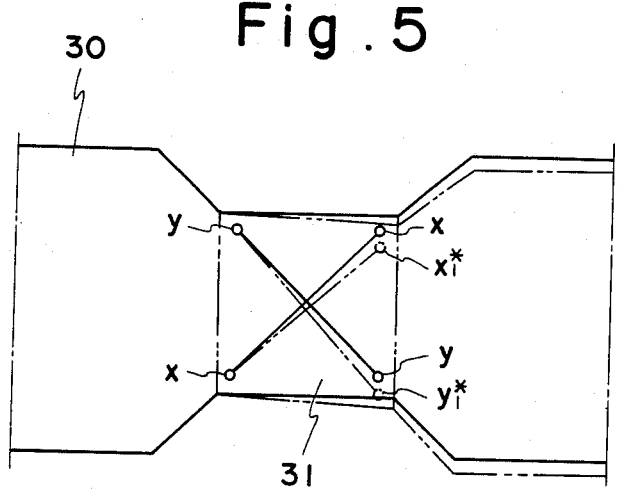
FIG. 5 is an explanatory view illustrating the state of deformation of a shear-deformable portion in the load sensor of FIG. 4.
Figure 6:
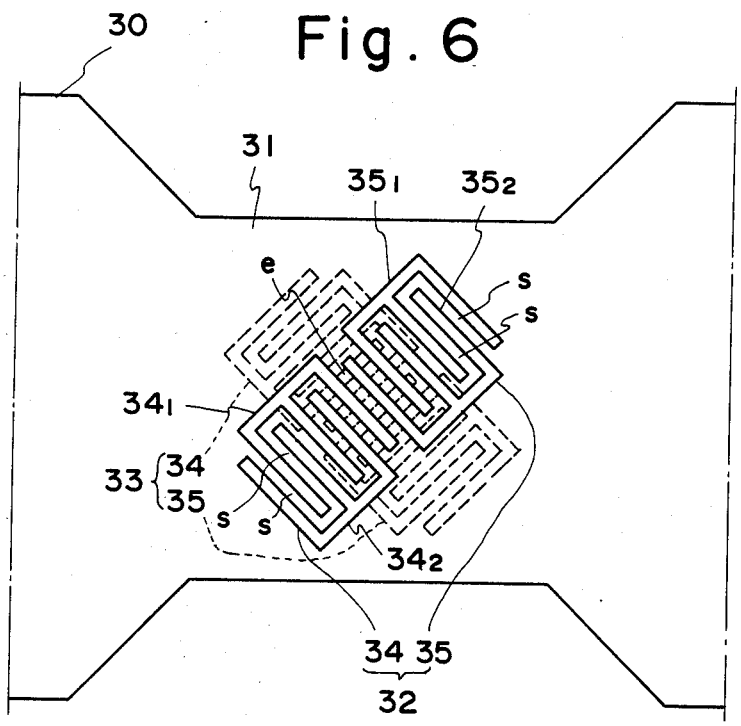
FIG. 6 is an enlarged view showing a principal portion of the load sensor of FIG. 4.
Figure 7:
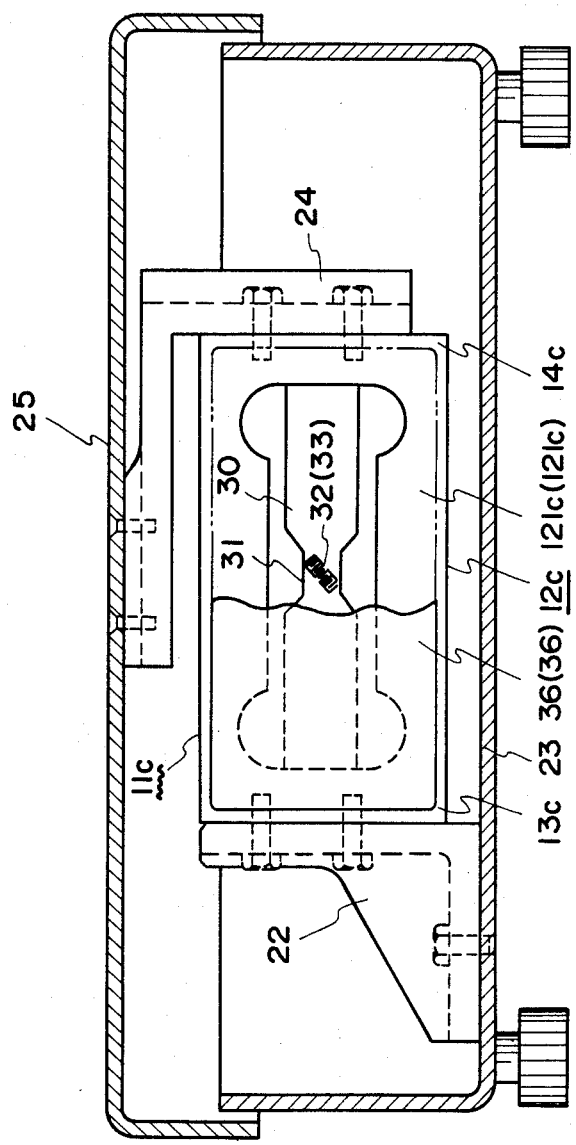
FIG. 7 is a front view illustrating the load sensor of FIG. 4 when applied to a weigher.

FIG. 7 illustrates an embodiment in which the load sensor 11c of FIGS. 4 through 6 is employed in a weigher. The load-sensitive element 12c of the load sensor 11 is secured at its fixed rigid portion 13c to a weigher case 23 via a bracket 22. A weighing dish 25 is attached to the movable rigid portion 14c of the load-sensitive element 12c via a bracket 24. When articles to be weighed are placed in the weighing dish 25 of the weigher having this construction, the load acts upon the movable rigid portion 14c of the load-acts sensitive element 12c through the bracket 24, and the weight of the articles is sensed by the elastic surface-wave resonators 32, 33.

In the load sensor 11c disposed within the weigher case 23 in this manner, both side surfaces 121c, 121c of the load-sensitive element 12c are open, and the shear-deformable portion 31 and, hence, the elastic surface-wave resonators 32, 33, is provided in the hollow portion of the load-sensitive element 12c. Therefore, as shown in FIG. 7, a sheet member 36 consisting of a material having a low coefficient of elasticity, such as silicone rubber, is bonded as by an adhesive to each side face 121c of the load-sensitive member 12c. This seals off the resonators 32, 33 from the outside and protects them against moisture, humidity and dust.

Figure 8:
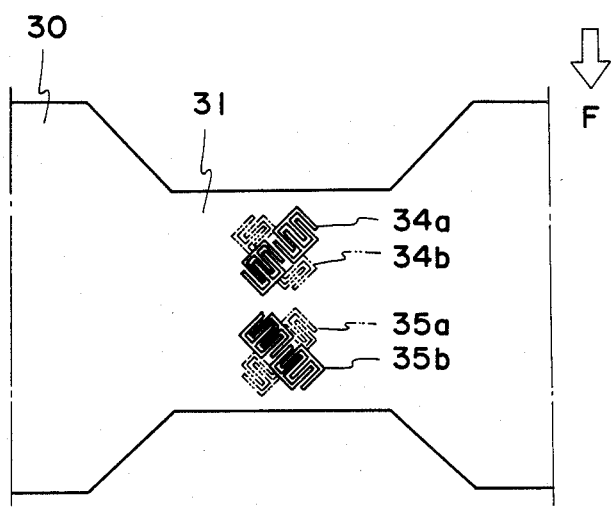
FIG. 8 is an enlarged view of a principal portion of a load sensor illustrating another exemplary arrangement of the elastic surface-wave resonators.

FIG. 8 is a side view illustrating another embodiment of the present invention and shows a shear-deformable portion 31 of a shear-deformable member 30 constituting a load sensor according to the invention. In this embodiment, only one side surface of the shear-deformable portion 31 is provided with one set of two elastic surface-wave resonators 34a, 35b affixed thereto. These are arranged to meet the direction of the applied load F at an angle of 45° and to extend in directions at right angles to each other. Since the resonators 34a, 35b are affixed to only one side of the shear-deformable portion 31 in this manner, the steps for affixing the resonators can be reduced and manufacturing cost can be lowered. Further, in another embodiment, one set of two elastic surface-wave resonators 34b, 35a is affixed to the other side surface of the shear-deformable portion 31 as well, as shown by the phantom lines in FIG. 8. These resonators 34b, 35a, are oriented in the same manner as the transducers 34a, 35b on the first side surface, and the resonators are combined with amplifiers to form two sets of oscillators the outputs of which are added. By using these two sets of oscillators, a load sensor having improved sensing accuracy can be obtained.

Figure 9:
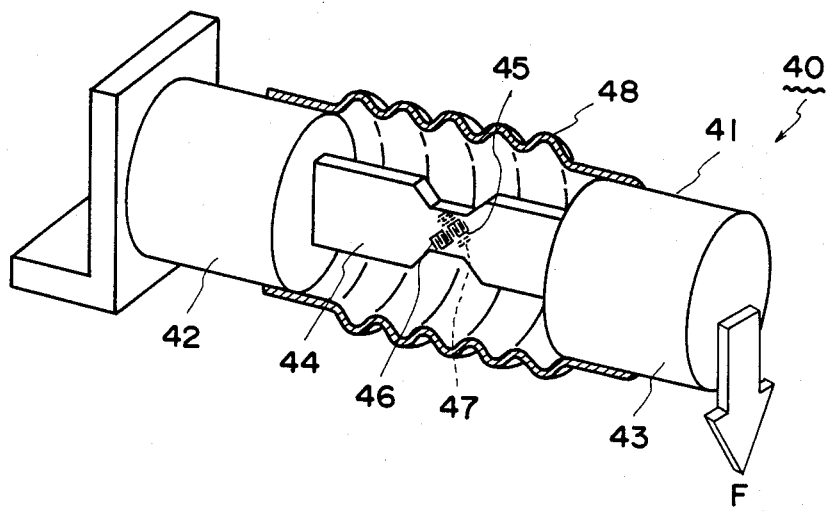
FIG. 9 is a perspective view, with a portion thereof broken away, showing another embodiment of a load sensor according to the present invention.

FIG. 9 is a perspective view, partially broken away, showing another embodiment of a load sensor according to the present invention.

In this embodiment, the load sensor, designated at numeral 40, includes a load-sensitive element 41 comprising a cylindrical, fixed rigid portion 42, a cylindrical, movable rigid portion 43, and a shear-deformable member 44 interconnecting the rigid portions 42, 43. Formed at the central portion of the shear-deformable member 44 is a shear-deformable portion 45 having an elastic surface-wave resonator 46 affixed to one side surface thereof and an elastic surface-wave resonator 47 affixed to the other side surface thereof. The resonators 46, 47 define an angle of 45° with the direction in which the load F is applied and intersect each other at right angles. A bellows 48 is fitted across the cylindrical rigid portions 42, 43 so as to seal the shear-deformable portion 45 and, hence, the elastic surface-wave resonators 46, 47.

Figure 10:
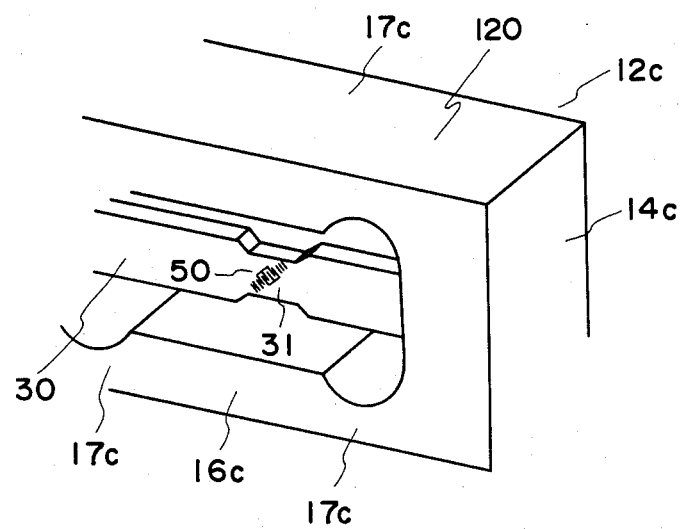
Figure 11:
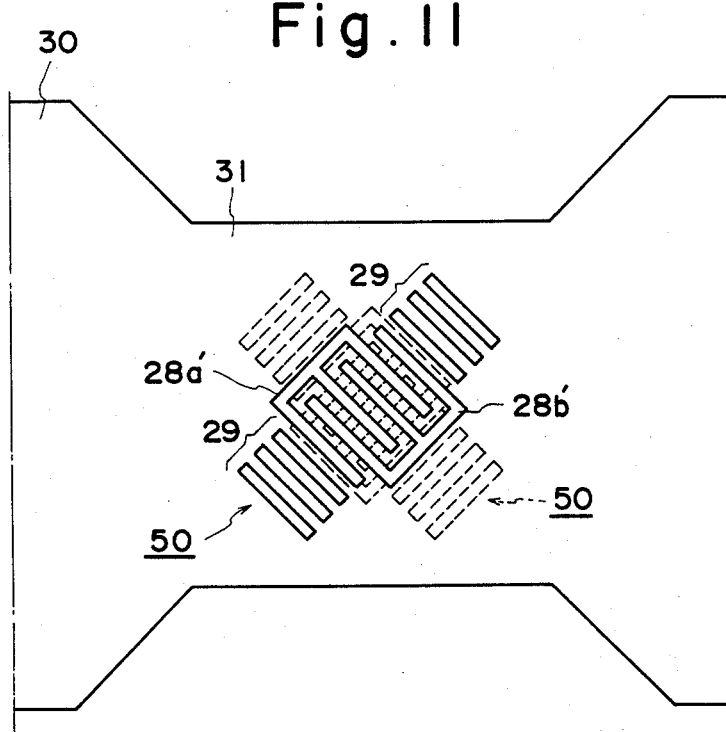
Figure 12:
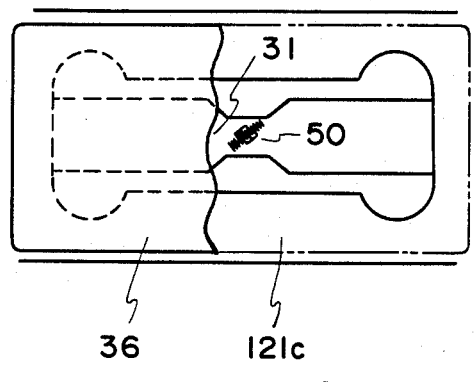
Figure 13:
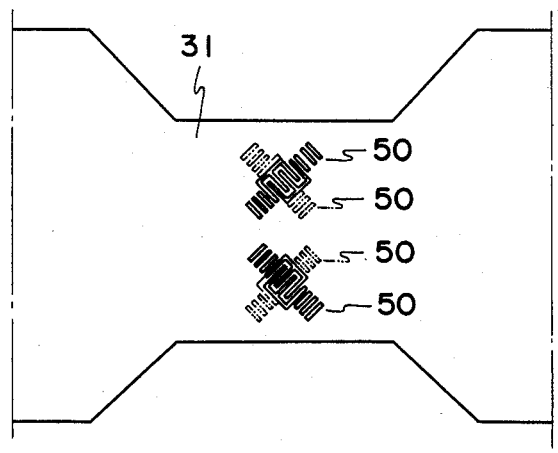
Figure 14:
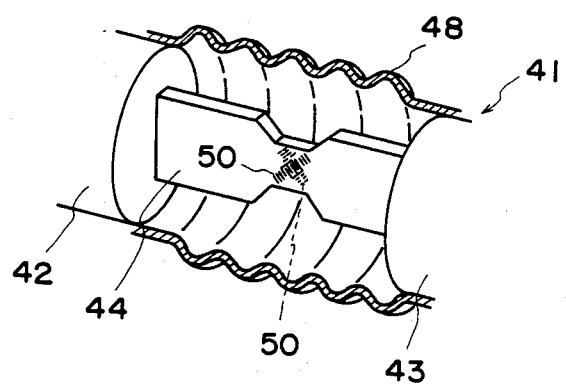

In the embodiments described thus far, the shear-deformable portion of the shear-deformable member has a two-port type elastic surface-wave resonator provided with two transducers. In each of the embodiments of FIGS. 10 through 14, however, the shear-deformable portion of the shear-deformable member has a one-port type elastic surface-wave resonator provided with one transducer. In the arrangement of FIG. 10 the transducers of the two ports of the embodiment shown in FIG. 4 are replaced by a transducer of one port, in the arrangement of FIG. 11 the transducers of the two ports of the embodiment shown in FIG. 6 are replaced by a transducer of one port, in the arrangement of FIG. 12 the transducers of the two ports of the embodiment shown in FIG. 7 are replaced by a transducer of one port and only the load sensor is illustrated, in the arrangement of FIG. 13 the transducers of the two ports of the embodiment shown in FIG. 8 are replaced by a transducer of one port, and in the arrangement of FIG. 14 the transducers of the two ports of the embodiment shown in FIG. 9 are replaced by a transducer of one port.

In the embodiments of FIGS. 10 through 14, portions similar to those illustrated in FIGS. 1 through 9 are designated by like reference characters and need not be described again. The structure of a one-port elastic surface-wave resonator will now be described with reference to FIG. 11. The resonator, designated at numeral 50, includes a pair of interdigital electrodes 28a', 28b' spaced apart a predetermined distance, and grading reflectors 29 disposed on the left and right sides of the electrodes 28a', 28b'. A surface wave having a wavelength corresponding to the spacing between the electrodes propagates between the pair of interdigital electrodes 28a', 28b' and the reflectors 29, and an output having a frequency dependent upon the wavelength is obtained as the output of the elastic surface-wave resonator 50. In other aspects, including the connection of an amplifier (not shown) across the interdigital electrodes 28a', 28b', the arrangement is similar to that of the two-port resonators described earlier. More specifically, as shown in FIGS. 10 through 14, at least one set of two resonators 50 each is provided on the shear-deformable portion of the load-sensitive element. The two resonators 50, 50 in each set each define an angle of 45° with the direction in which the load is applied and are oriented at right angles to each other. As a result, action is the same as that of a two-port resonator.

The grading reflectors 29 are formed integrally with, but electrically isolated from, the interdigital electrodes 28a', 28b' by the same technique, such as photolithography, used to form the interdigital electrodes.

As many apparently widely different embodiments of the present invention can be made without departing from the spirit and scope thereof, it is to be understood that the invention is not limited to the specific embodiments thereof except as defined in the appended claims.

What I claim is:

1. A load sensor for sensing a load based on an oscillation frequency deviation of an elastic surface-wave oscillator having an elastic surface-wave resonator and an amplifier, comprising:
 a fixed rigid portion fixedly secured to a stationary object;
 a movable rigid portion disposed in spaced relation from said fixed rigid portion for receiving an applied load;
 a shear-deformable member having one end portion fixedly secured to said fixed rigid member and an opposite end portion fixedly secured to said movable rigid member;
 a shear-deformable portion provided on said shear-deformable member;
 an elastic surface-wave resonator provided on said shear-deformable portion;
 a first beam interconnecting an upper end of said fixed rigid portion and an upper end of said movable rigid portion; and
 a second beam interconnecting a lower end of said fixed rigid portion and a lower end of said movable rigid portion, said first and second beams each having an arcuate cut-out at end portions thereof to form flexible portions of said end portions.

2. A load sensor according to claim 1, wherein said fixid rigid portion, said movable rigid portion and said first and second beams constitute a load-sensitive element, said load-sensitive element having a side face closed off by a sheet member to seal said shear-deformable member.

3. A load sensor according to claim 1, wherein said shear-deformable portion has a front side surface and a back side surface and an elastic surface-wave resonator is provided on each of said front and back side surfaces of said shear-deformable portion.

4. A load sensor according to claim 1, wherein said shear-deformable portion has a front side surface and a back side surface and a plurality of elastic surface-wave resonators are provided on each of said front and back side surfaces of said shear-deformable portion.

5. A load sensor according to claim 1, wherein said elastic surface-wave resonator comprises one transducer.

6. A load sensor according to claim 3, wherein said elastic surface-wave resonators provided on said shear-deformable portion are oriented at an angle with respect to the longitudinal direction of said shear-deformable member.

7. A load sensor according to claim 6, wherein said shear-deformable portion has a front side surface and a back side surface and an elastic surface-wave resonator is provided on each of said front and back side surfaces of said shear-deformable portion.

8. A load sensor according to claim 7, wherein the elastic surface-wave resonators provided on the front and back side surfaces of said shear-deformable portion are oriented in mutually opposing directions and define identical angles with respect to the logitudinal direction of said shear-deformable member.

9. A load senosr according to claim 7, wherein a plurality of elastic surface-wave resonators are formed on each side of said shear-deformable portion.

10. A load sensor according to claim 1, wherein said shear-deformable member is sealed between said fixed rigid member, said movable rigid member and said first and second beams.

11. A load sensor according to claim 1, wherein a plurality of elastic surface-wave resonators are provided on said shear-deformable portion.

12. A load sensor according to claim 1, wherein said elastic surface-wave resonator is oriented at an angle to the logitudinal direction of said shear-deformable member.

13. A load sensor for sensing a load based on an oscillation frequency deviation of an elastic surface-wave oscillator having an elastic surface-wave resonator and an amplifier, comprising:
- a fixed rigid portion fixedly secured to a stationary object;
- a movable rigid portion disposed in spaced relation from said fixed rigid portion for receiving an applied load;
- a shear-deformable member having one end portion fixedly secured to said fixed rigid member and an opposite end portion fixedly secured to said movable rigid member;
- a shear-deformable portion provided on said shear-deformable member;
- an elastic surface-wave resonator provided on said shear-deformable portion, and a corrugated bellows extending between said fixed rigid portion and said movable rigid portion, said shear-deformable member being sealed within said bellows.

* * * * *

UNITED STATES PATENT AND TRADEMARK OFFICE
CERTIFICATE OF CORRECTION

PATENT NO. : 4,623,813
DATED : Nov. 18, 1986
INVENTOR(S) : Naito et al.

It is certified that error appears in the above-identified patent and that said Letters Patent is hereby corrected as shown below:

Col. 1
Line 21, delete "1" and insert --$\ell$--;
Line 35, delete "1" and insert --$\ell$--;
Line 41, delete "1, to 1+ $\Delta$1." and insert --$\ell$, to $\ell + \Delta\ell$.--
Line 56, delete "some" and insert --same--.

Col. 2
Line 65, delete "1" and insert --$\ell$--.

Col. 8
Line 67, delete "Aload" and insert --A load--.

Signed and Sealed this

Twenty-fourth Day of March, 1987

Attest:

DONALD J. QUIGG

Attesting Officer    Commissioner of Patents and Trademarks